United States Patent
Hoglund

(10) Patent No.: US 11,572,125 B1
(45) Date of Patent: Feb. 7, 2023

(54) CLAMP ASSEMBLY FOR ATTACHING GRIP TO BIKE HANDLEBAR

(71) Applicant: OXO PRO PTE. LTD., Singapore (SG)

(72) Inventor: Ronny Hoglund, Jacobstad (FI)

(73) Assignee: OXO PRO PTE. LTD., Singapore (SG)

( * ) Notice: Subject to any disclaimer, the term of this patent is extended or adjusted under 35 U.S.C. 154(b) by 0 days.

(21) Appl. No.: 17/502,472

(22) Filed: Oct. 15, 2021

(30) Foreign Application Priority Data

Oct. 5, 2021 (TW) .................................. 110211720

(51) Int. Cl.
*B62K 21/26* (2006.01)

(52) U.S. Cl.
CPC .................................. *B62K 21/26* (2013.01)

(58) Field of Classification Search
CPC ...................................................... B62K 21/26
See application file for complete search history.

(56) References Cited

U.S. PATENT DOCUMENTS

| | | | |
|---|---|---|---|
| 6,263,759 B1 | 7/2001 | Hollingsworth et al. | |
| 6,615,688 B2 | 9/2003 | Wessel | |
| 7,866,002 B2 * | 1/2011 | Wang | B62K 21/26 74/551.8 |
| 9,067,638 B2 * | 6/2015 | Segato | B62K 21/26 |
| 2007/0157758 A1 * | 7/2007 | Shih | B62K 21/26 74/551.9 |
| 2011/0277586 A1 | 11/2011 | Yu | |
| 2012/0073400 A1 | 3/2012 | Wang | |
| 2021/0284285 A1 | 9/2021 | Bierwerth et al. | |

FOREIGN PATENT DOCUMENTS

DE     102018104636 B4 *   6/2021

OTHER PUBLICATIONS

International Search Report Issued By Foreign Patent Office in Application No. 21202867.4-1009.

* cited by examiner

*Primary Examiner* — Vicky A Johnson
(74) *Attorney, Agent, or Firm* — Rosenberg, Klein & Lee

(57) ABSTRACT

A clamp assembly for attaching a grip to a bike handlebar is provided. The clamp assembly includes an insertion member that is inserted between the grip and the bike handlebar and has an outer end formed with a jaw structure. A clamping member is disposed into and coupled with the jaw structure. The clamping member is of a C-shaped structure having a first end and a second end that face and correspond to each other and spaced by a spacing distance. With the clamping member being disposed into and coupled with the jaw structure of the insertion member, a fastening member is applied to reduce and shrink the spacing distance between the first end and the second end of the clamping member.

5 Claims, 3 Drawing Sheets

CLAMP ASSEMBLY FOR ATTACHING GRIP TO BIKE HANDLEBAR

BACKGROUND OF THE INVENTION

1. Field of the Invention

The present invention relates to a clamp assembly for a bike handlebar, and more particularly to a clamp assembly for attaching a grip to a bike handlebar.

2. The Related Arts

A known bike handlebar is structured by attaching a grip to an outer circumference of the bike handlebar, so that a rider may hold the grip to experience an effect of cushioning and comforting. However, for the known hand-gripping products that are currently available, there are various different designs, and consequently, some of such products may suffer poor fixedness and may get loosened, rotated, or other issues of instability.

Some of the hand-gripping products include a metal ferrule or a metal piece combined with the grip in order to achieve a more secured fastening effect. This, however, makes the metal ferrule or metal piece exposed outside the grip. A rider may necessarily have the hand touching the metal ferrule or metal piece when holding the grip with the hand. This causes discomfort particularly in cold days.

Further, considering the design for fastening structures, the known hand-gripping products do not focus on the needs for fixedness through clamping or fastening. Consequently, there is always an issue how to tightly and conveniently attach the grip to the bike handlebar.

SUMMARY OF THE INVENTION

Thus, the primary objective of the present invention is to provide a clamp assembly for a grip of a bike handlebar, in order to achieve a more secured and reliable fixed connection between a bike handlebar and a grip to thereby make a user feel comfortable.

The technical solution adopted in the present invention is that a clamp assembly is provided to combine a grip with a bike handlebar. The clamp assembly includes an insertion member that is inserted between the grip and the bike handlebar and has an outer end formed with a jaw structure. A clamping member is disposed into and coupled with the jaw structure. The clamping member is of a C-shaped structure having a first end and a second end that face and correspond to each other and spaced by a spacing distance. With the clamping member being disposed into and coupled with the jaw structure of the insertion member, a fastening member is applied to reduce and shrink the spacing distance between the first and second ends of the clamping member to tighten the clamping member in a direction toward the bike handlebar thereby clamping and fixing the jaw structure of the insertion member on the bike handlebar.

The efficacy of the present invention is that the grip is securely attached to the bike handlebar by means of a clamp assembly, without undesired loosening, rotating, or other issues of instability. Further, the hand of the rider feels an effect of comfort for gripping and holding. In view of the outside appearance, the structural arrangement according to the present invention makes metal parts of the grip concealed to thereby enhance the product value. In view of installation and tightening, the present invention allows the purpose of tightening to be achieved easily with simple application of bolts.

A specific technical solution adopted in the present invention will be further described below with reference to an embodiment and the attached drawings.

DETAILED DESCRIPTION OF THE PREFERRED EMBODIMENTS

Figure 1:
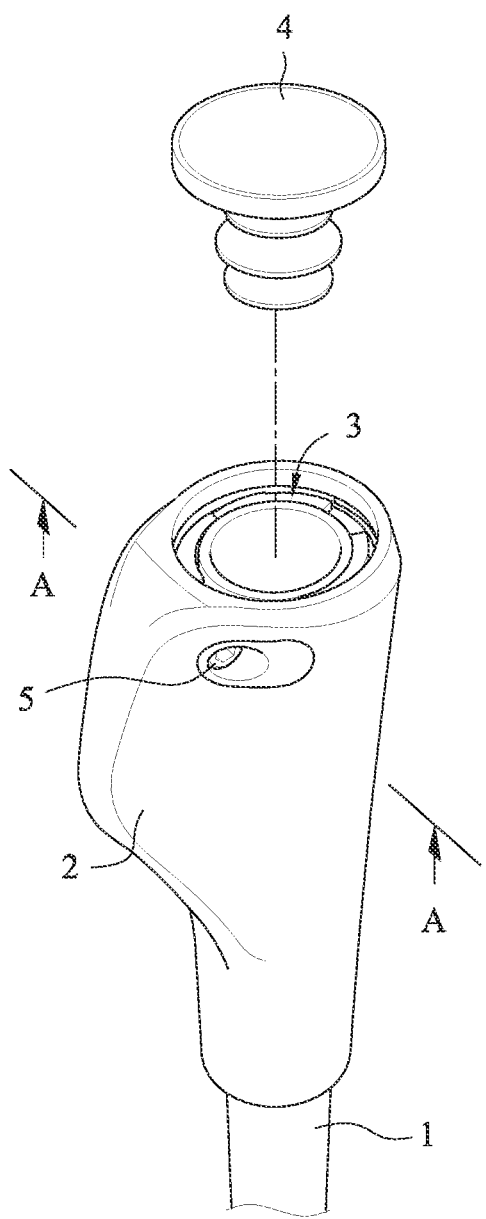
FIG. 1 is a perspective view of the present invention.

Referring to FIG. 1, it shows that a bike handlebar 1 is combined with a grip 2 and a clamp assemble 3. The grip 2 is sleeved over and attached to an outer circumferential surface of a bike handlebar 1, and the clamp assembly 3 is applied to securely combine the grip 2 with the bike handlebar 1. After the clamp assembly 3 is fit into and coupled to the grip 2, an end cap 4 is fit into and attached to a free end of the bike handlebar 1.

Figure 2:
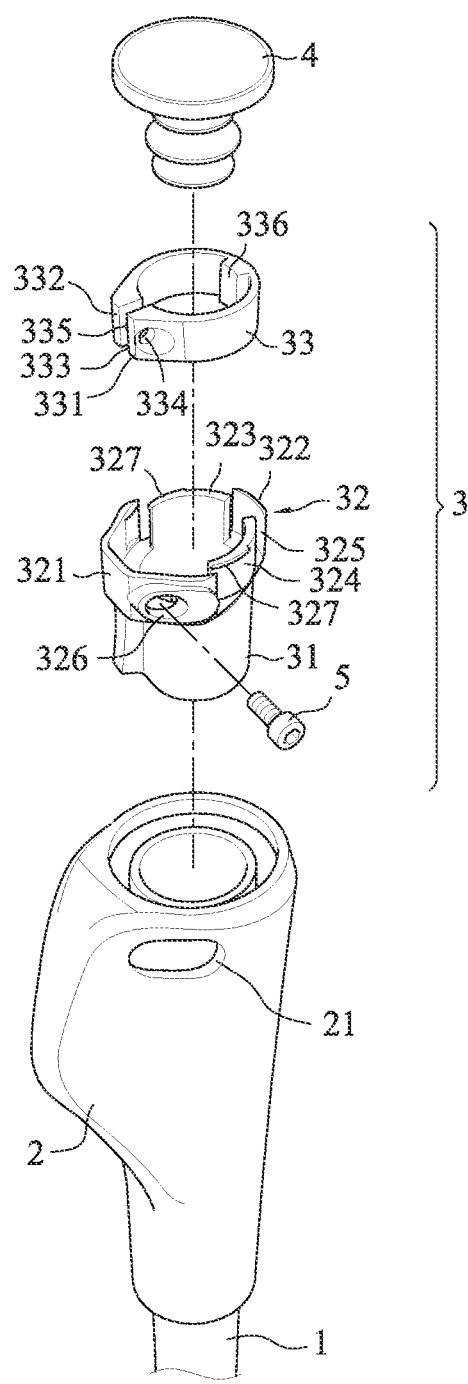
FIG. 2 is an exploded view showing associated components of the present invention in a separated condition.
Figure 3:
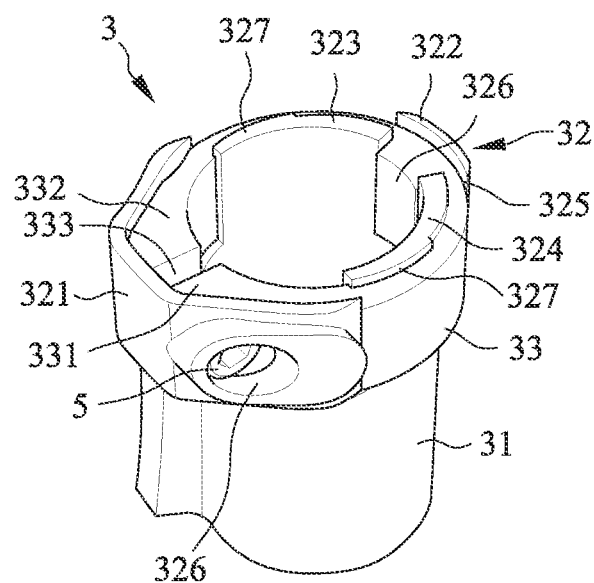
FIG. 3 is a perspective view showing a clamp assembly according to the present invention in an assembled form.

Referring jointly to FIGS. 2 and 3, the clamp assembly 3 comprises an insertion member 31, a jaw structure 32 formed at an outer end of the insertion member 31, a clamping member 33, and a fastening member 5.

The jaw structure 32 is integrally formed with the insertion member 31 as a unitary structure, and is extended in an axial direction from the outer end of the insertion member 31 by a predetermined length. The jaw structure 32 comprises at least one outer jaw and at least one inner jaw. In the embodiment illustrated in the drawings, two outer jaws 321, 322 that are arranged opposite to and facing to each other in a front-rear direction and two inner jaws 323, 324 that are arranged opposite to and facing to each other in a left-right direction are provided. The outer jaws 321, 322 are arranged at positions along a ring having a first diameter, and the inner jaws 323, 324 are arranged at positions along a ring having a second diameter. The second diameter is smaller than the first diameter, so that a fitting space 325 is formed between the outer jaws 321, 322 and the inner jaws 323, 324 to allow the clamping member 33 to fit into the fitting space 325.

Figure 4:
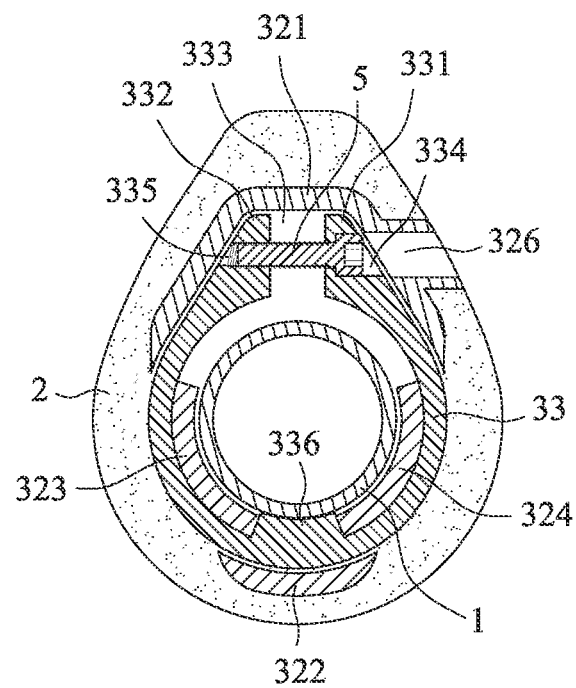
FIG. 4 is a cross-sectional view taken along line A-A of FIG. 1.

Referring also to FIG. 4, a cross-sectional view taken along line A-A of FIG. 1 is provided. The clamping member 33 is generally of a C-shaped structure, having a first end 331 and a second end 332 that face and correspond to each other. The first end 331 and the second end 332 are spaced from each other by a spacing distance 333.

The clamping member 33 is disposed into and coupled with the jaw structure 32 of the insertion member 31 to form the clamp assembly 3 of the present invention, and then the clamp assembly 3 can be inserted and fit between the grip 2 and the outer circumferential surface of the bike handlebar 1. Under this condition, an inner annular surface defined by the inner jaws 323, 324 of the jaw structure 32 is fit over and in contact engagement with the outer circumferential surface of the bike handlebar 1, and an inner annular surface defined by the outer jaws 321, 322 is in contact engagement with an outer circumferential surface of the clamping member 33.

The first end 331 of the clamping member 33 is formed with a through aperture 334, and the second end 332 is formed with a threaded hole 335. The through aperture 334 corresponds to an opening 326 formed in the outer jaw 321 of the jaw structure 32 and also corresponds to a hollowed part 21 formed in the grip 2. When the clamping member 33 is fit into and clamping on the jaw structure 32 and is combined with the grip 2, the fastening member 5 is first put through the opening 326 of the outer jaw 321 and the through aperture 334 of the first end 331 to be then screwed and thus tightened to the threaded hole 335 of the second end 332. The fastening member 5 can be for example a bolt and a tightening or fastening device including a bolt. Thus, application of the fastening member 5 reduces and contracts the spacing distance 333 between the first end 331 and the second end 332 of the clamping member 33 to have the clamping member 33 tightened in a direction toward the bike handlebar 1, thereby tightening and fixing the jaw structure 32 of the insertion member 31 to the bike handlebar 1.

A projection 336 is formed on an inner surface of the clamping member 33, and the projection 336 is arranged at a location corresponding to spacing between the two inner jaws 323, 324. A corresponding and retaining engagement relationship may be established between the projection 336 and the two inner jaws 323, 324, in order to prevent the clamping member 33 and the jaw structure 32 from relatively rotating during combining the two components together and also to achieve a more securely tightening and fixing relationship between the two inner jaws 323, 324 and the bike handlebar 1.

Further, each of the inner jaws 323, 324 is formed, at a top edge thereof, with an outward-projecting flange 327 that extends outwards in a radial direction, so that when the clamping member 33 is fit to and coupled with the jaw structure 32, the outward-projecting flange 327 may engage and thus grip on a top of the clamping member 33 to prevent the clamping member 33 and the jaw structure 32 from detaching from each other.

What is claimed is:

1. A clamp assembly for attaching a grip to an outer circumferential surface of a bike handlebar, comprising:
    an insertion member inserted between the grip and the outer circumferential surface of the bike handlebar, the insertion member having an outer end on which a jaw structure is formed, the jaw structure including at least one outer jaw and at least one inner jaw spaced from the at least one outer jaw by a fitting space therebetween;
    a clamping member disposed into and coupled with the jaw structure of the insertion member, the clamping member being of a C-shaped structure having a first end and a second end that face and correspond to each other, and are spaced from each other by a spacing distance, the clamping member being fit into the fitting space, wherein when the insertion member is inserted between the grip and the bike handlebar, an inner annular surface defined by the at least one inner jaw is fit over and in contact engagement with the outer circumferential surface of the bike handlebar, and an inner annular surface defined by the at least one outer jaw is in contact engagement with an outer circumferential surface of the clamping member; and
    a fastening member, which is operable, after the clamping member is disposed into the jaw structure of the insertion member, to reduce and shrink the spacing distance between the first end and the second end of the clamping member, so as to have the clamping member tightened in a direction toward the bike handlebar to tighten and fix the jaw structure of the insertion member to the bike handlebar.

2. The clamp assembly according to claim 1, wherein the clamping member comprises a projection arranged at a location corresponding to the at least one inner jaw.

3. The clamp assembly according to claim 1, wherein the at least one inner jaw has a free end that is formed with an outward-projecting flange, so that when the clamping member is coupled with the jaw structure, the outward-projecting flange engages and grips on a top of the clamping member to prevent the clamping member and the jaw structure from detaching from each other.

4. The clamp assembly according to claim 1, wherein the first end of the clamping member is formed with a through aperture, and the second end is formed with a threaded hole, wherein when the clamping member is fit into the jaw structure of the insertion member, the fastening member is put through the through aperture of the first end to screw into the threaded hole of the second end.

5. The clamp assembly according to claim 1, further comprising an end cap attached to an end of the bike handlebar.

* * * * *